United States Patent
Yoshinaga et al.

(10) Patent No.: US 12,324,408 B2
(45) Date of Patent: Jun. 10, 2025

(54) EXCREMENT TREATMENT MATERIAL AND METHOD FOR MANUFACTURING THE SAME

(71) Applicant: DAIKI CO., LTD., Tokyo (JP)

(72) Inventors: Junji Yoshinaga, Tokyo (JP); Shinobu Hatanaka, Tochigi (JP); Takahiro Hosoya, Tochigi (JP)

(73) Assignee: DAIKI CO., LTD., Tokyo (JP)

(*) Notice: Subject to any disclaimer, the term of this patent is extended or adjusted under 35 U.S.C. 154(b) by 8 days.

(21) Appl. No.: 18/381,259

(22) Filed: Oct. 18, 2023

(65) Prior Publication Data
US 2024/0040990 A1    Feb. 8, 2024

Related U.S. Application Data

(63) Continuation of application No. PCT/JP2021/019898, filed on May 26, 2021.

(51) Int. Cl.
*A01K 1/015* (2006.01)

(52) U.S. Cl.
CPC .................. *A01K 1/0155* (2013.01)

(58) Field of Classification Search
USPC ........................................................ 119/172
See application file for complete search history.

(56) References Cited

U.S. PATENT DOCUMENTS

| | | | | |
|---|---|---|---|---|
| 4,619,862 A * | 10/1986 | Sokolowski | ......... | A01K 1/0155 428/221 |
| 5,188,064 A * | 2/1993 | House | ................. | A01K 1/0154 119/172 |
| 5,295,456 A * | 3/1994 | Lawson | ............... | A01K 1/0154 119/172 |
| 6,220,206 B1 * | 4/2001 | Sotillo | ...................... | B29B 9/06 119/171 |
| 6,568,349 B1 * | 5/2003 | Hughes | ................ | A01K 1/0155 119/171 |
| 6,837,181 B2 * | 1/2005 | Schulein, Jr. | ........ | A01K 1/0155 119/171 |
| 7,124,710 B2 * | 10/2006 | Weaver | ............... | A01K 1/0155 119/171 |
| 7,856,946 B2 * | 12/2010 | Burckbuchler, Jr. | ........ | A01K 1/0155 119/171 |
| 9,538,722 B2 * | 1/2017 | Hiroshima | .......... | A01K 1/0154 |
| 10,051,835 B2 * | 8/2018 | Takagi | ................. | A01K 1/0155 |
| 11,000,828 B2 * | 5/2021 | Simonyan | .......... | B01J 20/28016 |

(Continued)

FOREIGN PATENT DOCUMENTS

| | | |
|---|---|---|
| CA | 2799113 A1 | 6/2014 |
| JP | 2005-110700 A | 4/2005 |

(Continued)

OTHER PUBLICATIONS

Aug. 17, 2021 Search Report issued in International Patent Application No. PCT/JP2021/019898.

(Continued)

*Primary Examiner* — Monica L Perry
*Assistant Examiner* — Maria E Graber
(74) *Attorney, Agent, or Firm* — Oliff PLC

(57) ABSTRACT

An excrement treatment material is composed of a grain that has a hydrophobic property. The grain contains a water-absorbent material as a main material, and contains baking soda.

18 Claims, 1 Drawing Sheet

(56) References Cited

U.S. PATENT DOCUMENTS

| | | | |
|---|---|---|---|
| 11,185,050 B2* | 11/2021 | Schumski | A01K 1/0155 |
| 2010/0300368 A1* | 12/2010 | Myers | B01J 20/261 |
| | | | 44/589 |
| 2015/0047571 A1* | 2/2015 | Mast | A01K 1/0152 |
| | | | 119/172 |
| 2016/0270363 A1* | 9/2016 | Takagi | A01K 1/0154 |
| 2017/0000079 A1 | 1/2017 | Lau | |
| 2021/0237035 A1* | 8/2021 | Gomes | B01J 2/28 |
| 2023/0320315 A1* | 10/2023 | Cameron | B65D 81/36 |
| | | | 119/172 |

FOREIGN PATENT DOCUMENTS

| | | |
|---|---|---|
| JP | 2015-112042 A | 6/2015 |
| JP | 2015-226503 A | 12/2015 |
| WO | 2018-047084 A1 | 3/2018 |

OTHER PUBLICATIONS

Aug. 17, 2021 Written Opinion of the International Searching Authority issued in International Patent Application No. PCT/JP2021/019898.

Mar. 28, 2025 Extended European Search Report issued in European Patent Application No. 21942960.2.

* cited by examiner

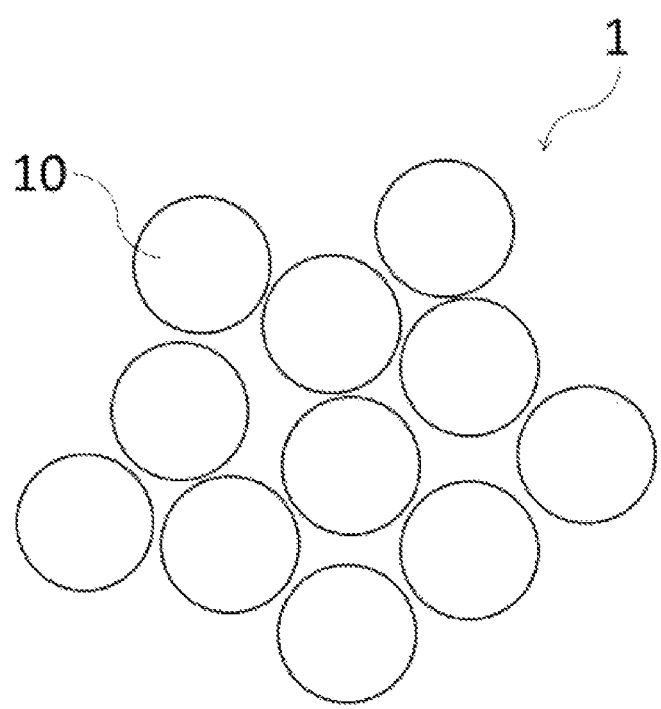

EXCREMENT TREATMENT MATERIAL AND METHOD FOR MANUFACTURING THE SAME

CROSS REFERENCE TO RELATED APPLICATION

This is a Continuation of International Application No. PCT/JP2021/019898 filed May 26, 2021. The contents of the application are hereby incorporated by reference in its entirety.

TECHNICAL FIELD

The present invention relates to an excrement treatment material and a method for manufacturing the same.

BACKGROUND ART

A conventional excrement treatment material is disclosed, for example, in Patent Document 1. The excrement treatment material disclosed in Patent Document 1 is composed of a plurality of grains that have a hydrophobic property (water-repellent property), and is laid in a pet toilet. The pet toilet is divided into an upper space and a lower space by a mesh sheet that allows urine to pass therethrough. The hydrophobic grains are disposed in the upper space. A liquid-absorbing sheet is disposed in the lower space. When a pet urinates, the urine passes through gaps between the hydrophobic grains, and arrives in the lower space through the mesh sheet. The urine having arrived in the lower space is absorbed by the liquid-absorbing sheet.

CITATION LIST

Patent Document

Patent Document 1: JP 2005-110700 A

SUMMARY OF INVENTION

Technical Problem

The hydrophobic excrement treatment material does not absorb urine at all or, if any, hardly absorbs it, and therefore is capable of being used repeatedly, unlike a water-absorbing excrement treatment material. However, in a case where grains are formed using a water-absorbent material such as papers as a main material, the surfaces of the grains need to be subjected to hydrophobic treatment in order for the grains to have a hydrophobic property. This is a factor that complicates a manufacturing process of the excrement treatment material.

Solution to Problem

The present invention has been made in view of the above-described problem, and it is an object thereof to provide an excrement treatment material that is capable of exhibiting a hydrophobic property without hydrophobic treatment, and a method for manufacturing the same.

An excrement treatment material according to the present invention is composed of a grain that has a hydrophobic property, wherein the grain contains a water-absorbent material as a main material, and contains baking soda.

The excrement treatment material is provided with the grain that contains a water-absorbent material as a main material, and contains baking soda. Adding baking soda in this way can enhance the liquid passing rate of the grain. For this reason, regardless of using the water-absorbent material as the main material, it is possible to obtain the grain that has a hydrophobic property without subjecting the surface of the grain to hydrophobic treatment.

A method for manufacturing an excrement treatment material according to the present invention is a method for manufacturing an excrement treatment material composed of a grain that has a hydrophobic property, the method including: a grain forming step of forming the grain that contains a water-absorbent material as a main material, and contains baking soda.

In this manufacturing method, the grain is formed that contains a water-absorbent material as a main material, and contains baking soda. Adding baking soda in this way can enhance the liquid passing rate of the grain. For this reason, regardless of using the water-absorbent material as the main material, it is possible to obtain the grain that has a hydrophobic property without subjecting the surface of the grain to hydrophobic treatment.

Advantageous Effects of Invention

According to the present invention, it is possible to implement an excrement treatment material that is capable of exhibiting a hydrophobic property without hydrophobic treatment, and a method for manufacturing the same.

BRIEF DESCRIPTION OF DRAWINGS

FIG. 1 is a schematic view showing an embodiment of an excrement treatment material according to the present invention.

DESCRIPTION OF EMBODIMENTS

Hereinafter, an embodiment of the present invention will be described in detail with reference to the drawings. In the description of the drawings, the same elements are given the same reference numerals, and a redundant description will be omitted.

FIG. 1 is a schematic view showing an embodiment of an excrement treatment material according to the present invention. An excrement treatment material 1 is an excrement treatment material used for treatment of excrement (mainly urine), and composed of a grain 10. In the present embodiment, the excrement treatment material 1 is composed of a plurality of the grains 10. Each grain 10 has a granular shape. Examples of the granular shape include a sphere, column, and ellipsoid. The particle diameter of each grain 10 is, for example, between 5 mm and 20 mm inclusive. As used herein, the particle diameter of the grain 10 shall be defined as the diameter of the minimum sphere that can include the grain 10.

The excrement treatment material 1 may be an excrement treatment material for animals that treats excrement of animals such as cats or dogs, or may be an excrement treatment material for humans that treats excrement of humans. The excrement treatment material 1 is used, for example, in a double-structured toilet (system toilet) that is divided into an upper space and a lower space by a partition member having a hole that allows urine to pass therethrough. In that case, the excrement treatment material 1 is used in a state in which the plurality of grains 10 are piled in the upper space (on the partition member) of the system toilet.

Each grain 10 has a hydrophobic property. That is, each grain 10 has the property of not absorbing liquid such as urine at all or, if any, hardly absorbing it. The grains 10 having the hydrophobic property require the liquid passing rate of 80% or more measured by the following test. First, a cylinder having the diameter of 50 mm and the depth of 30 mm is set on the upper surface of a drainboard that includes a large number of openings having the size of 3 mm×8 mm, and then the cylinder is filled with the grains 10 (sample). An empty container is set under the drainboard. Next, 20 ml of physiological salt solution is dripped from a position 20 mm higher than the upper end of the cylinder over 10 seconds. After 15 seconds passed from the end of the dripping, the mass (g) of the physiological salt solution in the container is measured. This physiological salt solution has passed through the sample (gaps between the grains 10). Then, the liquid passing rate (%) is found by calculating the value of "(the measured mass)/20×100". If the measured mass is 16 g or more, the liquid passing rate is 80% or more, and therefore the grains 10 are found to have the hydrophobic property.

Each grain 10 contains a water-absorbent material as a main material. As used herein, the main material refers to the material that accounts for the highest weight ratio in each grain 10, out of material(s) constituting the grain 10 (except for baking soda described later). The weight ratio of the main material (water-absorbent material) with respect to each grain 10 is preferably between 50% and 95% inclusive, and more preferably between 75% and 90% inclusive. The water-absorbent material is preferably an organic substance. As the water-absorbent material that is an organic substance, for example, papers, used tea leaves, plastics, or bean curd lees can be used. In the present embodiment, the water-absorbent material is not subjected to hydrophobic treatment.

The papers refer to a material made mainly of pulp. Examples of the papers include, in addition to ordinary paper, recycled pulp, a vinyl chloride wallpaper classified product (paper obtained by classifying vinyl chloride wallpaper), fluff pulp, papermaking sludge, and pulp sludge. As the plastics, for example, a disposable diaper classified product (plastic obtained by classifying disposable diapers) may be used. The bean curd lees are preferably dried bean curd lees.

Each grain 10 contains baking soda (sodium hydrogen carbonate) in addition to the water absorbent material. The weight ratio of the baking soda with respect to each grain 10 is equal to or second highest after the water-absorbent material. The weight ratio of the baking soda with respect to each grain 10 is preferably between 5% and 50% inclusive, and more preferably between 10% and 25% inclusive.

Each grain 10 contains a hydrophobic agent in addition to the water-absorbent material and the baking soda. As the hydrophobic agent, for example, paraffin can be used. The weight ratio of the hydrophobic agent with respect to each grain 10 is, for example, between 1% and 5% inclusive. In the present embodiment, each grain 10 is made only of the water-absorbent material, the baking soda, and the hydrophobic agent, and therefore does not contain another material (adhesive or the like).

In the present embodiment, each grain 10 is a granule, the surface of which is uncovered. In detail, each grain 10 is a granule obtained by granulating a granulating material (materials constituting each grain 10). Each grain 10 is not provided with a coating layer (layer that covers a part or the entirety of the surface of the granule). Therefore, each grain 10 has single-layer structure composed of the homogeneous granule.

Next, an example of a method for manufacturing the excrement treatment material 1 will be described as an embodiment of a method for manufacturing an excrement treatment material according to the present invention. The manufacturing method includes a grain forming step.

The grain forming step is a step of forming the grain 10. In this step, a plurality of granules that will serve as the grains 10 are formed by granulating the granulating material with a granulation apparatus. The granulating material is obtained by uniformly mixing the main material (water-absorbent material), the baking soda, and the hydrophobic agent. In the present embodiment, an extrusion granulator, which is a type of wet granulators, is used as the granulation apparatus. Prior to the granulation, pretreatment such as pulverization, kneading, and adding water is performed on the granulating material. The amount of the added water (weight ratio of the water with respect to the granulating material) is, for example, between 10% and 30% inclusive. After the granulation, posttreatment such as sieving, and drying is performed as needed. In the present embodiment, the surfaces of the granules are not covered or subjected to hydrophobic treatment after the granulation. Accordingly, the excrement treatment material 1 composed of the plurality of grains 10 is obtained.

The effects of the present embodiment will be described. In the present embodiment, the grain 10 is formed that contains the water-absorbent material as the main material, and contains the baking soda. Adding baking soda in this way can enhance the liquid passing rate of the grain 10. That is because the baking soda containing moisture functions as a solidifying agent, and thereby crevices become less likely to form on the surface or in the inside of the grain 10. The crevices serve as a path through which liquid such as urine enters inside the grain 10, and therefore are a factor that decreases the liquid passing rate of the grain 10. For this reason, regardless of using the water-absorbent material as the main material, it is possible to obtain the grain 10 that has a hydrophobic property without subjecting the surface of the grain 10 to hydrophobic treatment. Accordingly, the excrement treatment material 1 that is capable of exhibiting a hydrophobic property without hydrophobic treatment, and a method for manufacturing the same are implemented.

Moreover, because baking soda tastes bitter, it is possible to reduce the risk that animals such as cats, or children accidentally swallow the grain 10 by adding baking soda to the grain 10.

The grain 10 is a granule, the surface of which is uncovered. For this reason, it is possible to form the grain 10 without performing a step of covering the surface of the granule. Thus, the manufacturing process of the excrement treatment material 1 can be simplified.

The weight ratio of the baking soda with respect to the grain 10 is equal to or second highest after the water absorbent material. Adding a relatively large amount of baking soda to the grain 10 in this way makes it possible to sufficiently enjoy the function of baking soda as a solidifying agent. From this viewpoint, the weight ratio of the baking soda with respect to the grain 10 is preferably 5% or more, and more preferably 10% or more. On the other hand, if the ratio of the baking soda is too large, such an adverse effect that through holes of a die are clogged with excess baking soda during extrusion granulation is likely to occur. From this viewpoint, the weight ratio of the baking soda with respect to the grain 10 is preferably 50% or less, and more preferably 25% or less. However, it is not essential that the weight ratio of the baking soda is equal to or second highest after the water-absorbent material. For example, the weight ratio of the baking soda may be larger than the weight ratio of the water-absorbent material.

Making the ratio of the water-absorbent material large is advantageous in formability (easiness of forming during granulation) and shape retainability (difficulty of collapsing a shape after granulation) of the grain 10. From this viewpoint, the weight ratio of the water-absorbent material with respect to the grain 10 is preferably 50% or more, and more preferably 75% or more. On the other hand, if the ratio of the water-absorbent material is too large, the ratio of the baking soda becomes relatively too small, and thus the function of the baking soda as a solidifying agent is likely to be insufficient. From this viewpoint, the weight ratio of the water-absorbent material with respect to the grain 10 is preferably 95% or less, and more preferably 90% or less.

In the case where the water-absorbent material is an organic substance, it is possible to obtain the grains 10 suitable for being disposed of by incineration. This contributes to convenience for disposal of used grains 10. In the case of using papers as the water-absorbent material, it is possible to obtain the grains 10 particularly suitable for being disposed of by incineration. Furthermore, in the case of using recycled pulp as the water-absorbent material, it is also possible to contribute to effective use of waste paper.

The grain 10 contains a hydrophobic agent. Thus, the hydrophobic property of the grain 10 can be further enhanced.

The grain 10 is made only of the water-absorbent material, the baking soda, and the hydrophobic agent. In this case, the grain 10 having a hydrophobic property can be obtained with simple constitution.

In order to confirm the effects of the present embodiment, the excrement treatment material 1 was manufactured actually by the manufacturing method described above. The composition of each of the manufactured grains 10 was as follows.

water-absorbent material . . . 81.1 wt. %
    baking soda . . . 16.2 wt. %
    hydrophobic agent . . . 2.7 wt. %

As the water-absorbent material, recycled pulp was used. As the hydrophobic agent, paraffin was used. Note that the amount of added water during extrusion granulation was set to 13.5 wt. %. The liquid passing rate of the grains 10 measured by the test described above was 95.5%. In this way, the manufactured excrement treatment material 1 exhibited a sufficient hydrophobic property.

The present invention is not limited to the above-described embodiment, and various modifications can be made. In the above-described embodiment, an example is given in which the grain 10 contains a hydrophobic agent. However, it is not essential that the grain 10 contains a hydrophobic agent. That is, each grain 10 may be made only of the water-absorbent material, and the baking soda.

In the above-described embodiment, each grain 10 may contain one or more materials selected from the group consisting of an adhesive, a coloring agent, and a deodorizing antimicrobial agent in addition to or in place of the hydrophobic agent. Examples of the adhesive include starch such as cornstarch, CMC (carboxymethyl cellulose), PVA (polyvinyl alcohol), and dextrin. The weight ratio of the adhesive with respect to each grain 10 is, for example, between 1% and 5% inclusive. Examples of the coloring agent include chalk powder in addition to general dyes and pigments. The weight ratio of the coloring agent with respect to each grain 10 is, for example, between 1% and 5% inclusive. Examples of the deodorizing antimicrobial agent include copper compounds such as copper sulfate, and catechin powder. The weight ratio of the deodorizing antimicrobial agent with respect to each grain 10 is, for example, between 0.1% and 1% inclusive.

In the above-described embodiment, an example is given in which the water-absorbent material is an organic substance. However, the water-absorbent material may be an inorganic substance, or may be a mixture of an organic substance and an inorganic substance.

LIST OF REFERENCE NUMERALS

1 Excrement Treatment Material
10 Grain

The invention claimed is:

1. An excrement treatment material, comprising
a grain that has a hydrophobic property,
wherein the grain contains a water-absorbent material as a main material, and contains baking soda,
wherein the grain has no coating layer,
wherein the excrement treatment material contains the baking soda in an amount of from 10% by weight to 50% by weight of the grain, and
wherein the excrement treatment material has a liquid passing rate of 80% or more.

2. The excrement treatment material according to claim 1, wherein the grain is a granule.

3. The excrement treatment material according to claim 1, wherein a weight ratio of the baking soda with respect to the grain is equal to or second highest after the water-absorbent material.

4. The excrement treatment material according to claim 1, wherein the water-absorbent material is an organic substance.

5. The excrement treatment material according to claim 4, wherein the water-absorbent material is paper.

6. The excrement treatment material according to claim 5, wherein the water-absorbent material is recycled pulp.

7. The excrement treatment material according to claim 1, wherein the grain contains a hydrophobic agent.

8. The excrement treatment material according to claim 7, wherein the hydrophobic agent is paraffin.

9. The excrement treatment material according to claim 7, wherein the grain consists only of the water-absorbent material, the baking soda, and the hydrophobic agent.

10. A method for manufacturing an excrement treatment material comprising a grain that has a hydrophobic property, the method comprising:
a grain forming step of forming the grain that contains a water-absorbent material as a main material, and contains baking soda,
wherein the grain has no coating layer,
wherein the excrement treatment material contains the baking soda in an amount of from 10% by weight to 50% by weight of the grain, and
wherein the excrement treatment material has a liquid passing rate of 80% or more.

11. The method for manufacturing an excrement treatment material according to claim 10,
wherein in the grain forming step, the grain is a granule, and the granule is formed by granulating a granulating material.

12. The method for manufacturing an excrement treatment material according to claim 10, wherein in the grain forming step, the grain is formed such that a weight ratio of the baking soda with respect to the grain is equal to or second highest after the water-absorbent material.

13. The method for manufacturing an excrement treatment material according to claim 10,
    wherein the water-absorbent material is an organic substance.

14. The method for manufacturing an excrement treatment material according to claim 13,
    wherein the water-absorbent material is paper.

15. The method for manufacturing an excrement treatment material according to claim 14,
    wherein the water-absorbent material is recycled pulp.

16. The method for manufacturing an excrement treatment material according to claim 10,
    wherein in the grain forming step, the grain is formed to further contain a hydrophobic agent.

17. The method for manufacturing an excrement treatment material according to claim 16,
    wherein the hydrophobic agent is paraffin.

18. The method for manufacturing an excrement treatment material according to claim 16,
    wherein in the grain forming step, the grain that is formed consists only of the water-absorbent material, the baking soda, and the hydrophobic agent.

* * * * *